June 28, 1955

R. I. HAKOMAKI 2,711,780

METHOD AND APPARATUS FOR BUTT WELDING
THERMOPLASTIC MATERIAL

Filed April 24, 1950

INVENTOR:-
RAYMOND I. HAKOMAKI

BY *William C. Babcock*

ATTORNEY

June 28, 1955
R. I. HAKOMAKI
2,711,780
METHOD AND APPARATUS FOR BUTT WELDING THERMOPLASTIC MATERIAL
Filed April 24, 1950
4 Sheets-Sheet 2
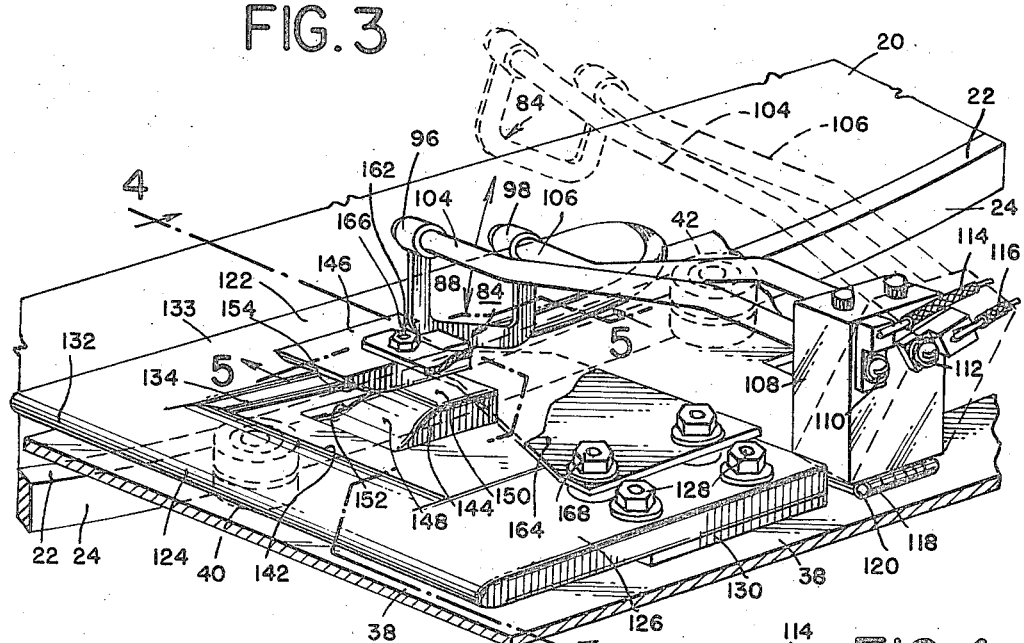
INVENTOR.-
RAYMOND I. HAKOMAKI
BY William C. Babcock
ATTORNEY June 28, 1955  R. I. HAKOMAKI  2,711,780
METHOD AND APPARATUS FOR BUTT WELDING
THERMOPLASTIC MATERIAL
Filed April 24, 1950  4 Sheets-Sheet 3
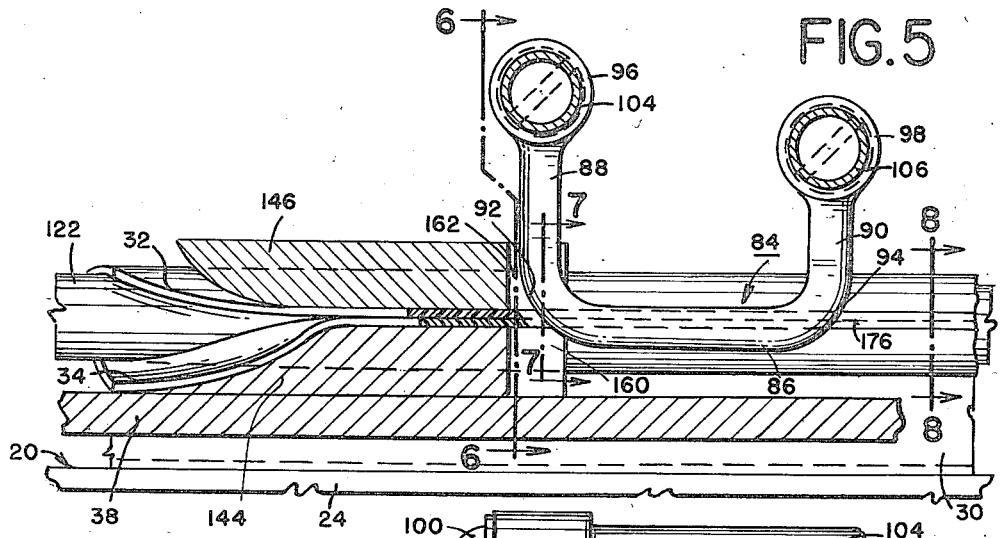
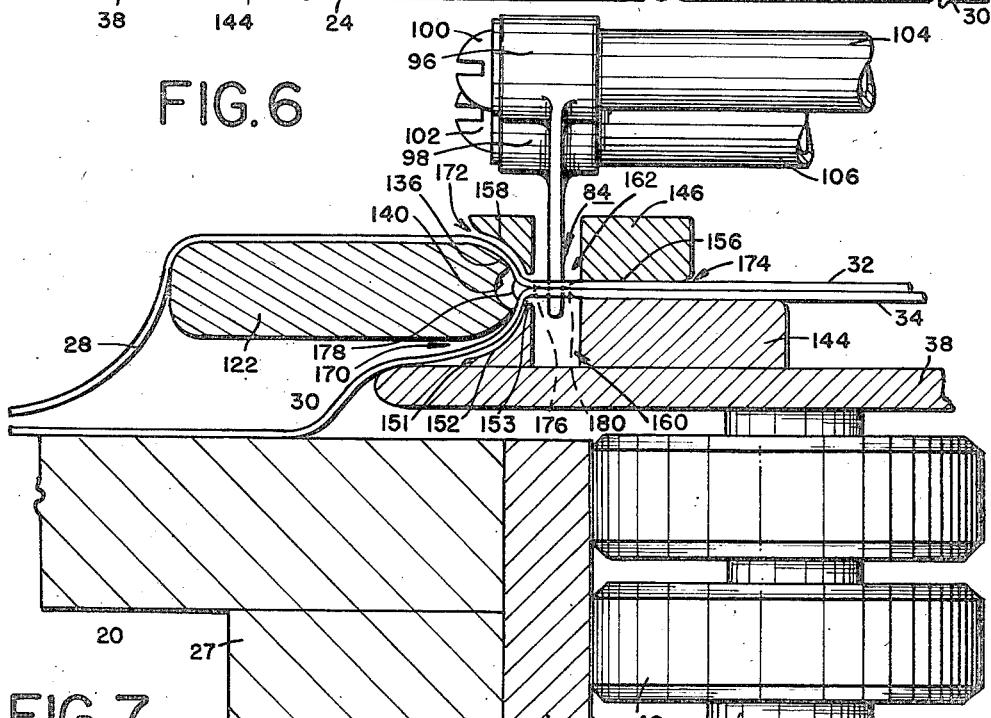
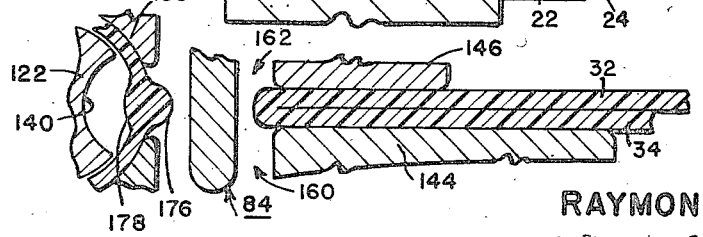
INVENTOR:
RAYMOND I. HAKOMAKI
BY William C. Babcock
ATTORNEY

INVENTOR:-
RAYMOND I. HAKOMAKI

United States Patent Office 2,711,780
Patented June 28, 1955

2,711,780

METHOD AND APPARATUS FOR BUTT WELDING THERMOPLASTIC MATERIAL

Raymond I. Hakomaki, Minneapolis, Minn., assignor to General Mills, Inc., a corporation of Delaware Application April 24, 1950, Serial No. 157,703

26 Claims. (Cl. 154—42)

The present invention relates to improved methods and apparatus for joining sheets of thermoplastic material, and more particularly to methods and apparatus for the formation of an improved butt seam between such layers.

A number of prior methods are known for the formation of seams between layers of thermoplastic material. One such method involves the simultaneous cutting and fusing of superimposed layers of thermoplastic material by means of a heated welding member. In such a method and apparatus, the layers of material to be joined are superimposed with their free edges projecting in the same direction in face-to-face contact. When these projecting opposed edges are severed and fused by a heated member, a seam may be formed which includes a projecting bead of substantial size. When the superimposed layers are then flattened in a common plane, the resulting seam has this projecting bead on one surface and a slight recess or groove at the opposite surface. While such seams can be made as strong as the material itself, there is nonetheless a tendency, when the sheets are tensioned transversely of the seam, to impose a greater stress at one surface of the seam than at the other. There is accordingly a definite need for a method and apparatus for the formation of a seam in which the stresses will be uniformly distributed from surface to surface of the material when such material is tensioned transversely of the seam.

With these problems of the prior art in view, it is accordingly one object of the present invention to provide improved methods and apparatus for the formation of butt seams between sheets of thermoplastic material.

Another object is the provision of a method of forming butt seams which involves the steps of melting and fusing the projecting opposed free edges of the material, and then holding or flattening the material in a common plane during initial cooling and setting of the fused seam.

A further object is the provision of seaming apparatus in which the material is guided with its free edges in projecting face-to-face relation while a heated welding member is applied to said projecting edges, and in which the portions of material at each side of the fused seam are then guided in flat or coplanar relation during setting of the seam.

An additional object is a seaming apparatus in which a heated welding member severs and fuses the projecting free edges of sheets of thermoplastic material, and in which the portions of material at each side of the fused seam are then guided in a common plane and subjected to the action of special cooling means while in that plane.

Further objects and advantages of the invention will be readily apparent from the following specification in which preferred embodiments of the invention are described, with particular reference to the accompanying drawings. In these drawings, Figure 1 is a partial top or plan view of a seaming apparatus according to the invention, certain portions being broken away and other portions being shown in dotted outline for clearness.

Fig. 3 is a partial perspective view showing details of the welding and guide members of the device of Fig. 1.

Fig. 4 is a partial sectional view on the line 4—4 of Fig. 3.

Fig. 5 is an enlarged sectional view on the line 5—5 of Fig. 1.

Fig. 6 is a partial sectional view on the line 6—6 of Fig. 5.

Fig. 7 is a similar partial enlarged view on the line 7—7 of Fig. 5.

Fig. 8 is a partial sectional view on the line 8—8 of Fig. 5.

Figure 1:
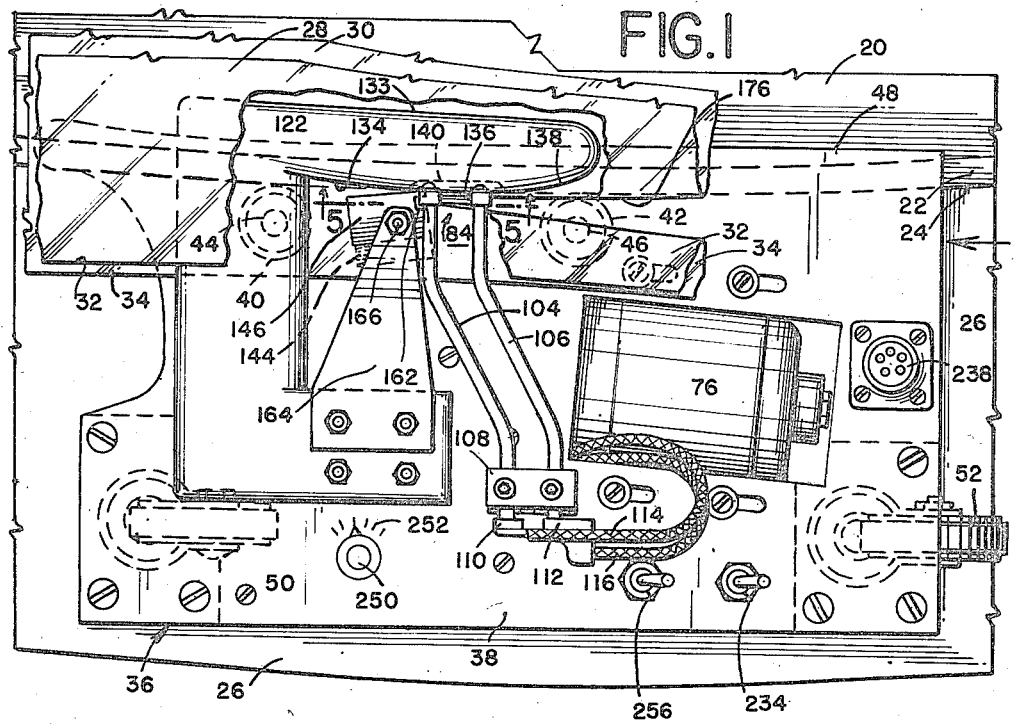

In the embodiment shown in Figs. 1 through 9, the apparatus of the present invention includes a main supporting table 20 for the layers of material to be welded. This supporting table 20 has at one edge a guide strip 22 having a substantially perpendicular outer edge 24 of the same contour (in vertical or plan view) as the desired seam between the layers of material on table portion 20. The table includes a downwardly offset platform or support 26 which extends the length of the table below and outside of the edge 24 of guide 22. The respective table portions 20 and 26 are vertically spaced by suitable supporting members 27 (Fig. 4).

The upper or main table portion 20 accordingly provides a support for the superimposed layers 28 and 30 of thermoplastic sheet material to be joined according to the invention. The free edges 32 and 34 of the respective upper and lower layers 28 and 30 project in the same direction in opposed face-to-face engagement as shown in Fig. 1. Thus these edges project outwardly from the main table portion 20 and overhang the downwardly offset supporting platform 26.

For the formation of the desired seam, a movable seaming unit, designated generally at 36, is provided. Seaming unit 36 is designed for relative movement with respect to the material layers 28 and 30 on the main table portion 20, the direction of relative movement being parallel at all times to the edge 24 of guide strip 22.

Seaming apparatus 36 includes a main supporting plate 38 provided at one edge with longitudinally spaced guide rollers 40 and 42. These guide rollers are rotatably mounted on vertical spindles 44 and 46 at the edge of plate 38 adjacent guide strip 22. The edges of rollers 40 and 42 are accordingly designed to engage the vertical edge 24 of guide strip 22 and thus provide a means for orientation of the plate 38 parallel to the guide strip 22 at all times. In other words, rollers 40 and 42 limit the lateral movement of the plate or support 38 toward the main table portion 20.

Plate 38 extends slightly over the table edge and overlaps it as shown at 48. The plate 38 is maintained in its desired vertical position, so that the overlapping edge 48 of the plate will be spaced just slightly above the main table portion 20, by means of supporting rollers 50, 52, and 54. Supporting rollers or wheels 50 and 52 are of the caster type and are rotatably supported in frames which are free to pivot around the vertical spindles 56 and 58. Thus supporting wheels 50 and 52 can change their relative angular position and thus permit the seaming apparatus and its supporting plate 38 to follow the path determined by edge 24 of guide 22 under the influence of the remaining supporting wheel 54 described below.

Figure 2:
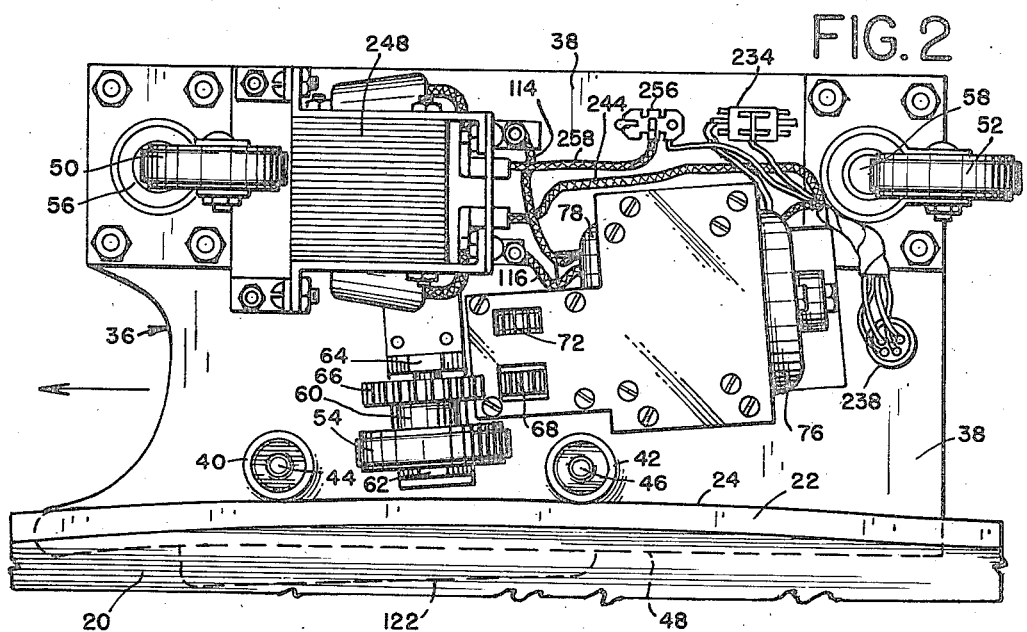
Fig. 2 is a partial bottom view of the device of Fig. 1.

Supporting wheel or roller 54 is designed as a power or driving wheel to provide means for causing relative movement of the seaming unit 36 along the supporting platform 26. Driving and supporting roller 54 is accordingly supported on a horizontal driving shaft 60 which is angularly disposed as shown in Fig. 2. Thus the driving effect of roller 54 (which will be in a plane perpendicular to shaft 60) will be angularly disposed with respect to a line joining the centers of spindles 44 and 46 of guide rollers 40 and 42.

As illustrated, the device 36 is designed for movement from right to left in Figs. 1 and 2. The forward edge of roller 54 is accordingly nearer the straight line joining the centers of spindles 44 and 46 than is the rear portion of roller 54. The net result of this angular arrangement of shaft 60 and roller 54 is that the driving roller 54 not only urges the supporting plate 38 and seaming unit 36 from right to left in Figs. 1 and 2, but also urges the unit toward the edge 24 of guide strip 22 on the main table portion 20 at all times.

The relative angle of attack of driving wheel 54 is great enough so that the seaming unit 36 will be urged toward the guide strip 22 and so that the guide rollers 40 and 42 will constantly engage the edge 24 of said guide strip even though the guide strip provides an arcuate or curved path, rather than a straight line path for the seaming unit. As indicated above, the additional supporting rollers 50 and 52 are free to pivot on the vertical spindles 56 and 58, so that they will accommodate themselves readily to the changes in direction of the seaming unit 36 under the influence of the angular drive roller 54 and the arcuate guide strip 22.

The apparatus is accordingly suitable for use either in a table in which the guide strip 22 forms a closed path completely around the table, so that the seaming unit 36 can move continuously around such closed path, or in connection with a table in which the guide strip extends along only one side and in which the seaming unit 36 moves in one direction throughout the length of strip and is then carried manually back to its starting point for another run. In either case, the apparatus moves along the path determined by the guide strip, without any other special track and without particular attention or control by the operator.

The driving mechanism for drive roller 54 is shown particularly in Figs. 2 and 4. Thus the supporting shaft 60 for drive roller 54 is journalled in bearing arms 62 and 64 projecting downwardly from the supporting plate 38 and secured to the plate in any desired manner. Shaft 60 carries a gear 66 which is in driven engagement with another gear 68 on an intermediate shaft 70. A worm wheel 72 on intermediate power shaft 70 is driven by a worm 74 on the main shaft 76 of motor 78. Motor 78 is mounted on the under side of the supporting plate 38. The motor is provided with leads 80 and 82 for connection in a suitable electrical circuit as described below.

At the point where the seam between superimposed layers 28 and 30 is desired, the seaming unit 36 is provided with a welding member designated generally at 84. As shown particularly in Fig. 5, this welding member 84 includes a longitudinally extending main body portion 86 which lies substantially in the plane of the sheets of material and which has a greater vertical thickness than the combined thickness of the layers to be joined. The welding member includes a vertically extending forward section 88 and a vertically extending rear supporting post 90, these vertical sections being joined to the longitudinal main body portion 86 by smoothly curved sections 92 and 94. Member 84 is designed to be heated by the passage of an electric current through it. The material and the dimensions of the member 84 as well as the voltage applied to it are designed to provide an operating temperature substantially higher than the melting point of the particular material to be joined. Preferably, the temperature should be somewhat above the burning or ignition temperature of the thermoplastic material so that the member 84 can burn its way through or along the superimposed projecting free edges 32 and 34 of the thermoplastic material. For most applications, the welding or cutting member 84 will be at red heat. In welding polyethylene sheets, for example, particularly good results may be obtained by maintaining the temperature of the member 84 in the range from 900° to 2000° F. A welding member of this general type, and a method of welding employing such a member are described in the copending application of Alton H. Carland, Serial No. 156,475 filed April 17, 1950, entitled Method and Apparatus for Severing and Joining Layers of Thermoplastic Material, and assigned to the assignee of the present application.

The front and rear supporting posts or vertical portions 88 and 90 of the welding member 84 are provided with integral hubs 96 and 98 which are connected by suitable bolts 100 and 102 to conducting and supporting rods 104 and 106, respectively. These conducting and supporting members 104 and 106 are secured at their opposite ends to an insulating block or support 108 and are provided with individual terminals 110 and 112 to which electrical leads 114 and 116 are connected.

The insulating support 108 is pivoted or hinged at 118 to the supporting plate 38 of the seaming apparatus in order that the welding member 84 may be swung from the operative heavy line position of Fig. 3 upwardly to the dotted line position of the figure to facilitate proper initial positioning of the sheet material. The provision of this pivotal mounting, with its axis or hinge pin 120 oriented longitudinally and substantially parallel to the path of desired relative movement of the welding member 84 makes it possible to position the sheet material initially in the guide members described below and then to swing the welding member down to the heavy line position of Fig. 3 when it is desired to start the seaming operation.

According to the invention, guide members are provided for orienting and positioning the sheet material in the desired position for operation of the welding member 84. One of these guide members is in the form of a supporting shoe 122 which extends longitudinally of the seaming unit 36 above the inner edge 48 of plate 38. This longitudinally extending shoe or guide member 122 may extend slightly inwardly beyond the inner edge 48 of plate 38 as shown in Fig. 2. Member 122 is supported at its forward end by an integral transverse arm 124 which in turn is connected to a supporting portion or extension 126 mounted at the outer edge of plate 38. This supporting section 126 or shoe 122 is fastened to the supporting plate 38 by suitable bolts 128. A spacing member 130 is located between the section 126 and the plate 38 in order to space the section 126, the transverse arm portion 124 and the supporting shoe 122 slightly above plate 38. The purpose of this spacing is to permit the lower sheet of material 30 to pass beneath the supporting shoe or guide 122 or, in other words, between said guide member 122 and the plate 38 of the seaming unit.

At its forward end, where the shoe or guide 122 joins the integral transverse arm 124, the guide is smoothly rounded or tapered at 132 in order that there will be no sharp edges or corners to interfere with the passage of the material to be seamed. Furthermore, the guide member 122, while it has a substantially straight inner edge 133, i. e., the edge nearest the main body of material to be seamed, has an outer edge which is somewhat tapered from a portion of lesser width 134 at its forward end (Fig. 1) to an intermediate portion 136 of maximum width located substantially opposite the welding member 84. This edge of the guide member 122 then tapers or narrows again toward its rearward end as indicated at 138.

It should be noted that the intermediate portion 136 of maximum width extends rearwardly somewhat beyond the end of the welding member 84 for a purpose to be described. The curvature of the outer edge from 136 to 138 corresponds to the sharpest curvature at any point along the guide member 122 of the supporting table, in order that the end portion at 138 will not stretch the newly formed seam.

The outer edge 134, 136, 138 of the guide member 122 is of substantial vertical thickness and is smoothly rounded as shown in the drawings in order to provide a substantially vertical edge or surface to guide the seamed layers of material and hold them in substantially coplanar relation during the period immediately following the melting of the material by the member 84.

With further reference to the supporting member 122, it should be noted that this outer rounded edge portion is provided with a longitudinally extending recess 140 (Figs. 1, 6, and 7). This recess extends over the longitudinal area opposite the welding member 84 and substantially in the plane of the material which is being welded. The recess also extends rearwardly slightly beyond the area of the welding member 84. The purpose of the longitudinal recess is to prevent contact of the melted or highly heated thermoplastic material of the seam with the supporting shoe 122 until the seam has partially set.

As shown in Fig. 3, the transverse supporting arm 124 of the guide shoe 122 is tapered in vertical section to a relatively thin trailing edge at 142. This tapered rear edge of the portion 124 permits the outer free edges 32 and 34 of the thermoplastic material to approach each other and assume a position in projecting face-to-face engagement after the transverse portion 124 has passed between the layers. In this connection it will be noted that the lower layer of material 34 passes beneath the guide shoe 122 as described above and also beneath the transverse arm portion 124. Similarly the upper layer of sheet material 32 passes above the guide shoe 122 and the transverse arm 124 and then reapproaches the lower layer rearwardly of the transverse arm 124.

As a further means for proper positioning of the layers to be seamed, two additional guide members 144 and 146 are provided. Member 144 constitutes a lower guide which is mounted in direct contact with the supporting plate 38 of the apparatus. This lower guide 144 includes a forward sloping portion 148 which tapers smoothly upwardly from the level of the upper surface of plate 38 to its region of maximum vertical thickness at 150. This upper surface 150 of guide member 144 serves as a support for the superimposed projecting free edges of the material during the actual initial stage of the welding operation. Guide member 144 also includes an inner or longitudinally extending surface 152 which is curved from a horizontal innermost point 151 to a substantially vertical outermost portion 153. The curvature of this portion 152 is substantially the same as the curvature of the lower portion of the outer edge of supporting shoe 122 so that an arcuate channel is formed between the shoe 122 and the lower guide 144. This channel, which is arcuate in transverse cross section, extends longitudinally of the apparatus in the direction of the desired seam. The channel is designated generally at 170 in Fig. 6 and serves as a guide for the lower sheet 30 of thermoplastic material. This lower sheet is accordingly guided or maintained in the arcuate channel.

The member 146, on the other hand, comprises an upper guide which cooperates with the upper portion of the outer edge of shoe 122 to provide an arcuate guide channel for the upper layer 28 of the material. Thus the upper guide member 146 includes a forward portion 154 which tapers downwardly and rearwardly from the top of the guide to the flat lower surface of the guide at 156. Similarly, the inner edge of the upper guide 146 is provided with a longitudinal portion which is arcuate in cross section as shown at 158 (Fig. 6) and which in cooperation with the upper portion of rounded shoe edge 136 provides a longitudinally extending arcuate guide channel 172 for the upper sheet 28 of material.

Both the lower and upper guide members 144 and 146 are provided at their rearward edges with slots or notches 160 and 162, respectively. These slots, which are in vertical alignment with each other, are designed to receive and accommodate at least the forward portion of the heated seaming or welding member 84. Thus as shown in Fig. 5, the forward vertical section 88 and the smoothly curved leading edge 92 of the welding member 84 are located within the slots 160 and 162.

The upper guide 146 is carried by a resilient supporting arm 164 and is mounted on said arm by a vertical bolt or screw at 166. By adjustment of the fastening member 166, the upper guide 146 may be adjusted with respect to the vertical axis at 166, in order to center the welding member 84 with respect to the upper slot 162, and also in order to vary the lateral or transverse spacing of the rear portion of guide 146 from the supporting shoe 122.

The supporting arm 164 for upper guide 146 is secured at 168 to the section 126 by which the guide shoe 122 is mounted. The resilience of supporting plate 164 makes it possible to lift the upper guide 146 manually during initial positioning of the layers of sheet material. At the same time this resilience holds the upper guide 146 down in close contact with the upper free edge 32 of the material and thus provides a longitudinally extending horizontal channel 174 through which these superimposed free edges are guided.

Reference to Fig. 6 will indicate that the three guide members 122, 144, and 146 thus cooperate with each other to provide three guide channels extending longitudinally of the seaming apparatus. Two of these guide channels 170 and 172 meet each other in substantially a common vertical plane, while the third or horizontal channel 174 is substantially perpendicular to this common vertical plane and thus defines a line of intersection which extends longitudinally of the apparatus along the line of the desired seam. The longitudinal recess 140 in the outer edge of guide shoe 122 is located exactly opposite this horizontal channel 174 and in the plane of said channel.

The welding member 84 located in slots 160 and 162 is designed to engage, sever, and melt the material of the superimposed free edges 32 and 34 at a point in the horizontal channel 174 which is slightly spaced laterally from the meeting line of the three channels 170, 172, and 174. As the heated welding member 84 and the seaming apparatus 36 are moved longitudinally with respect to the material, the member 84 will melt and sever the superimposed free edges 32 and 34 in the region of the slots 160 and 162. When the welding member 84 is maintained within the recommended temperature range, it will not only melt the material sufficiently to sever the layers in this manner, but will actually melt and soften the material a substantial distance inwardly from the welding member toward the meeting point of the three guide channels. There is accordingly a tendency for the two layers 28 and 30 to be fused together along substantially the line of intersection of the three guide channels, with the material melted or fused all the way back to the point 176 (Fig. 6). Once the layers have been severed, there is also a tendency for the upper and lower layers 28 and 30 to be withdrawn inwardly through slots 170 and 172 to bring the resulting seam into the common vertical plane at which these channels meet. By suitable adjustment and proportion of the parts, it is accordingly possible to guide the material into this common vertical plane so that the portions of the layers 28 and 30 at each side of the seam 176 are flattened or held in substantially coplanar position while the material of the seam is still substantially melted and softened. The softening or melting is sufficiently great so that some of the material tends to flow toward the side of the seam opposite the welding member 84 and form a slight bead at 178. Thus a true butt seam is formed in which the portions adjacent the seam are held in a common plane while the melted material of the seam is permitted to set or harden. The resulting seam can be subjected to tension in a direction transversely of the seam, without any substantial inequality in the stress at the respective inner and outer surfaces of the seam.

It will be noted that another seam 180 is formed between the inner edges of the upper and lower outer portions or free edges 32 and 34 of the thermoplastic material. Since, however, these portions 32 and 34 are both held in the horizontal channel 174, the seam 180 will be of the more orthodox fused bead type rather than a butt seam. These free edges 32 and 34 and their seam 180 are normally discarded as waste.

The preliminary setting or cooling of the material of the butt seam at 176 and 178 is achieved in the present instance, not only by the air itself as the welding member leaves a particular area, but also by engagement of the seam with the rearwardly extending portion of the guide shoe 122. As shown in Fig. 8, this rearward shoe portion is of substantial vertical thickness, so that the material layers 28 and 30 which extend above and below it tend to remain in a substantially coplanar vertical position at the edge of the shoe behind the welding member. Thus the coplanar orientation of the portions at each side of the seam 176 is maintained long enough for cooling engagement with the rearward portions of shoe 122 and the resulting hardening or setting of the seam.

The apparatus of Figs. 1–8 accordingly accomplishes the objects of the present invention and provides a relatively efficient means for practicing the process of the invention. This process involves the severing of the superimposed projecting free edges of sheets of thermoplastic material by a heated welding member, and the reorientation of the portions of material at each side of the fused seam into a common plane prior to the hardening or setting of the material. Thus the process involves the step of maintaining the melted or fused seam portions in substantially coplanar relation from a time at which the material is plastic or semi-fluid until the time that it begins to assume rigidity. The process further contemplates the provision of a cooling step to shorten the period during which it is necessary to maintain the coplanar orientation of the portions at each side of the seam.

Figure 9:
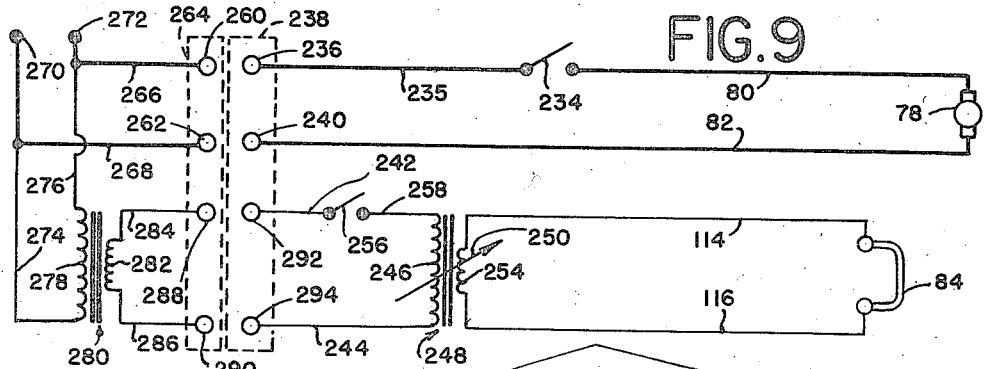
Fig. 9 is a wiring diagram of the welding apparatus of Figs. 1–8 of the drawing.

Suitable circuit connections for the embodiment of the preceding figures are shown in the wiring diagram of Fig. 9. Thus one of the leads 80 from motor 78 is connected to a suitable "on-off" switch 234 mounted on the supporting plate 38. The other side of switch 234 is connected by a further lead 235 with one terminal 236 of a connecting plug 238 also mounted on the supporting plate. A second terminal 240 of the plug 238 is directly connected to the motor lead 82.

Terminals 236 and 240 are designed for engagement by cooperating terminals 260 and 262 of a connecting plug (shown schematically at 264). Terminals 260 and 262 are connected through leads 266 and 268 to the terminals 270 and 272 of an electric supply line, such as the usual 110 volt A. C. supply. Thus switch 234 provides a convenient means for energizing and de-energizing the motor 78 and thus controlling the relative movement of the seaming apparatus 36 along the edge of table portion 20.

The supply terminals 270 and 272 are also connected, through leads 274 and 276 to the primary 278 of a stepdown transformer 280. The secondary 282 of this transformer is connected through leads 284 and 286 to terminals 288 and 290 of connecting plug 264. The corresponding terminals 292 and 294 of the cooperating plug 238 are connected by leads 242 and 244, respectively, to one side of a switch 256 and to the primary circuit 246 of a variable transformer 248. A lead 258 completes the circuit between switch 256 and the transformer primary. This transformer includes a rheostat or control member 250 mounted on supporting plate 38 and having a pointer cooperating with a scale or index 252 to show the relative adjustment of the transformer.

The secondary circuit 254 of the transformer is connected to the leads 114 and 116 from the heated welding member 84. Thus the "on-off" switch 256 provides a convenient means for energizing and deenergizing the heated welding member 84, while the control knob or rheostat 250 makes it possible to vary the voltage applied to the welding member 84 and thus vary the exact temperature of the member. In some cases the relative location of the step-down transformer 280 and the variable transformer 248 may be interchanged, particularly where it is desired to have the adjustable control 250 at a stationary point, instead of on the movable seaming unit.

For a given speed of relative movement of the seaming apparatus 36 with respect to the table 20 and superimposed layers 28 and 30 (which depends on the speed of operation of motor 78 and the gear ratios between the motor and the driving wheel 54), the transformer control member 250 may be adjusted to provide a temperature at the welding member which is best adapted for the formation of the desired weld at that speed. The incorporation of the heated welding member 84, the respective guides for the sheet of material, the transformer, and the power driving means for the device in one convenient assembly offer definite advantages of operation and ease of manufacture.

Figure 10:
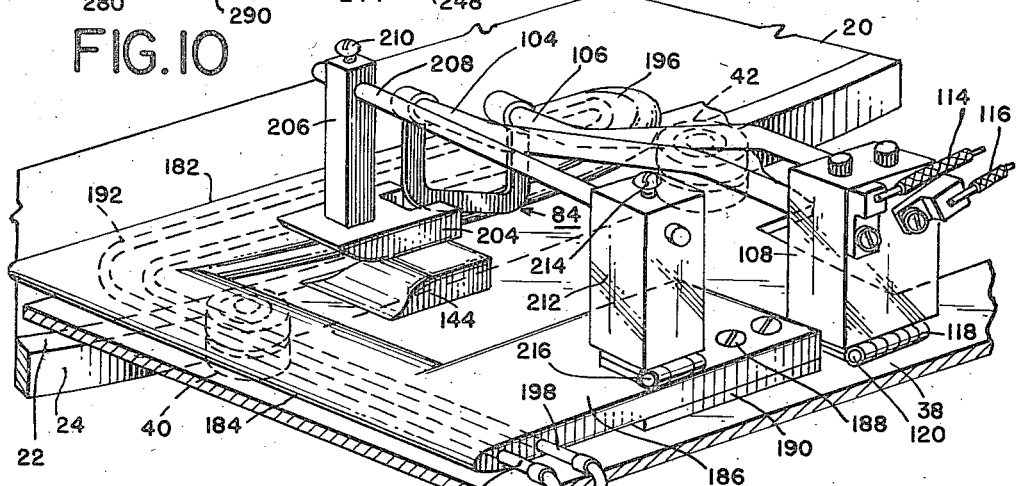
Fig. 10 is a partial perspective view, similar to Fig. 3, of a further modification of the apparatus according to the invention.

The alternate embodiment of Fig. 10 shows one modified form of apparatus in which the cooling action can be accelerated according to the process of the present invention. In this embodiment a guide shoe 182 is provided which is substantially identical in external shape, size, and appearance with the guide or support 122 of the embodiment of Figs. 1–8. Thus the guide member 182 is in the form of a rearwardly projecting extension integrally formed at the inner end of a transverse arm 184 extending from the supporting portion 186. Portion 186 in turn is secured at 188 to the base plate 38 of the seaming apparatus. A spacer 190 between the support portion 186 and the base or support 38 provides the necessary clearance just as in the case of the spacer 130 in Fig. 3.

In this case, however, the supporting shoe 182 is provided with an internal passage 192 for the circulation of a cooling fluid, i. e., a gas or a liquid. This internal cooling passage 192 extends from an inlet 194 at the point where transverse arm 184 joins the support portion 186, across the transverse arm and rearwardly to the extreme end 196 of the shoe 182. The passage is then doubled on itself and extends forwardly through the shoe 182, transversely through the arm 184 to an outlet 198 connecting tubes 200 and 202 on the inlet and outlet respectively to provide means for attachment to a suitable source of cooling fluid.

With this arrangement, the cooling effect of the shoe on the melted and fused material of the newly formed seam is substantially accelerated. Thus there is no danger that the newly formed seam will move relatively out of engagement with the rear end 196 of shoe 182 prior to the time at which the seam will be substantially set or hardened. At the same time the use of a longitudinal recess at the outer edge of the guide shoe 182, similar to the recess 140 of the embodiment of Figs. 1–8, will avoid any premature cooling effect on the melted material of the seam at the line of intersection of the three guide channels immediately opposite the heated welding member.

In the device of Fig. 10, a modified mounting for the upper guide member is also provided. In this case the lower guide member 144 is the same as that of the previous embodiments. The upper guide member 204 is itself shaped and formed substantially identically to the upper guide 146. This upper guide 204, however, carries a vertical supporting post 206 through which a hollow supporting rod 208 is passed. A set screw 210 permits relative transverse adjustment of the post 206 and consequently of the guide 204, along the rod 208.

The other end of rod 208 is mounted in a supporting block 212 and is secured therein by a set screw or other fastening member 214. This supporting block 212 for the upper guide 204 is hinged or pivoted at 216 to the supporting portion 186 of guide shoe 182. The hinged or pivotal mounting of the support 212 for the upper guide 204 facilitates the raising of the guide 204 during initial insertion of the material.

The welding member 84 and its supporting means and electrical connections, are the same in this case as in the preceding figures.

Figure 11:
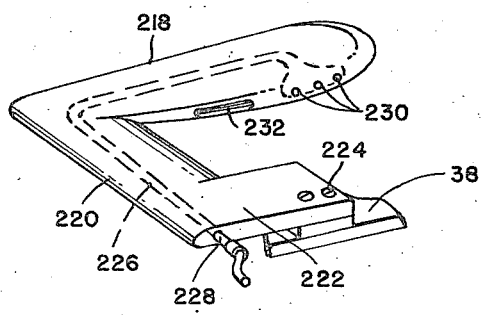
Fig. 11 is a perspective view of a guide and supporting shoe according to still another modification of the invention.

In Fig. 11, still another modification of the cooling and supporting shoe is shown. In this case the guide shoe 218 again has the same external shape as the guide members 122 and 182 previously described. This guide shoe is carried by a transverse arm portion 220 integrally joined to a supporting portion 222. Portion 222 is secured at 224 to the supporting plate 38 of the seaming apparatus.

A passageway 226 is provided which extends from an inlet 228 at the outer end of the transverse arm 220, through the arm and through the shoe 218 to one or more discharge openings 230 in the rear portion of the outer edge of guide 218. Discharge openings 230 are designed to direct a cooling gas directly against the softened material of the newly formed seam immediately after the seam has been formed. Thus the ports 230 are located just in the rear of the longitudinal recess 232 which is substantially the same in construction and function as the recess 140 of the first embodiment.

Figure 12:
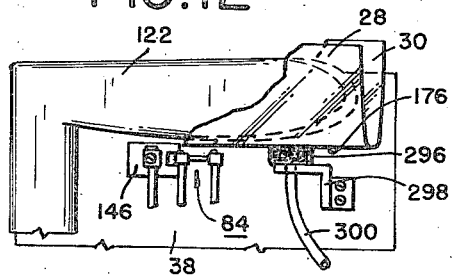
Fig. 12 is a partial plan view of a modified cooling means in which a cooling liquid directly engages the seam.

Fig. 12 illustrates a further modification of the cooling means according to the present invention. In this embodiment, the supporting shoe 122, guide 146, and welding member 84 are the same as in the device of Figs. 1–8. In order to cool the seam, a sponge 296 is mounted on a bracket 298 fastened to supporting plate 38 and located so that the sponge is maintained in contact with the seam. The sponge 296 is kept moist through a capillary tube 300 connected to a suitable liquid supply. A highly evaporative liquid may be used to increase the cooling effect. Obviously the particular liqud used should be one which does not dissolve or otherwise adversely affect the thermoplastic material which is being seamed.

Figure 13:
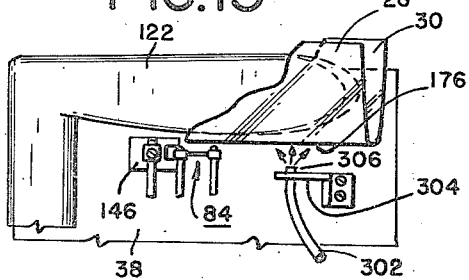
Fig. 13 is a partial view, of a modified cooling means in which a cooling gas is directed at the seam.

Fig. 13 shows still another cooling means according to the invention. In this case, the same supporting shoe 122, guide 146 and welding member 84 are again used. A tube 302 is mounted by a bracket 304 on plate 38 and has its discharge end 306 located and arranged to direct a current of cooling air or gas directly against the newly formed seam, as the latter moves away from the seaming member 84. Tube 302 is connected to an air line or other source of cooling gas.

The cooling action of the air, gas or liquid in these last two embodiments is effective against the outer side of the newly formed seam, i. e., the same side that is directly subjected to the heat of the welding member 84. In the other embodiments previously described, the cooling effect was at the inner or opposite surface of the seam.

According to the foregoing description, a method and apparatus have been provided which accomplish the objects of the present invention. A practical method for the formation of butt seams between layers of thermoplastic material has thus been made available. While this method may be practiced manually or with other forms of apparatus, the embodiments described herein represent the preferred forms of apparatus for the carrying out of this process.

Since minor variations and changes in the exact details of construction will be apparent to persons skilled in this field, it is intended that this invention shall cover all such changes and modifications as fall within the spirit and scope of the attached claims.

Now, therefore, I claim:

1. The method of welding relatively thin layers of thermoplastic sheet material which comprises superimposing the layers in adjacent parallel planes with their surfaces in face-to-face contact and with the layers extending in the same direction from the desired weld line, melting the contacting surfaces along the line of the desired weld, and flattening the melted portions of the layers by swinging the layers relatively to each other around the weld line until the layers extend in substantially coplanar relation and in opposite directions from the weld line before the melted material is set.

2. The method of welding relatively thin layers of thermoplastic sheet material which comprises superimposing the layers in adjacent parallel planes with their surfaces in face-to-face contact and with the layers extending in the same direction from the desired weld line, melting the contacting surfaces along the line of the desired weld to form a seam between the layers and separating the contacting surfaces of the welded layers adjacent the seam (thereby flattening the seam) before the melted material is set.

3. The method of welding relatively thin layers of thermoplastic sheet material which comprises superimposing the layers in adjacent parallel planes with their surfaces in face-to-face contact and with the layers extending in the same direction from the desired weld line, melting the contacting surfaces along the line of the desired weld to form a seam between the layers, and simultaneously separating the contacting surfaces of the welded layers adjacent the seam, thereby forming a butt seam before the melted material is set.

4. The method of welding relatively thin layers of thermoplastic sheet material which comprises superimposing the free edge portions of the layers in adjacent parallel planes with their surfaces in face-to-face contact and with the layers extending in the same direction from the desired weld line, melting the superimposed edge portions along the line of the desired weld to form a seam between the layers, and spreading the contacting portions of the welded layers at each side of the seam into substantially a common plane with the layers extending from the seam in opposite directions, thereby forming a butt seam before the melted material is substantially set.

5. The method of forming a butt-weld between sheets of relatively thin thermoplastic material which comprises positioning the sheets in superimposed face-to-face engagement with the sheets extending in the same direction in substantially parallel and adjacent planes from the line of desired weld, melting and fusing both sheets along said line of desired weld while the sheets are so positioned, and immediately thereafter, before the melted material has substantially set, swinging the sheets relatively to each other around an axis coinciding generally with the weld line until the sheets extend in coplanar relation in opposite directions from the weld line.

6. The method of forming a butt-weld between sheets of relatively thin thermoplastic material which comprises positioning the sheets in superimposed face-to-face engagement with the sheets extending in the same direction in substantially parallel and adjacent planes from the line of desired weld, melting and fusing both sheets along said line of desired weld while the sheets are so positioned, immediately thereafter, before the melted material has substantially set, swinging the sheets relatively to each other around an axis coinciding generally with the weld line until the sheets extend in coplanar relation in opposite directions from the weld line, and holding the sheets in said coplanar relation adjacent the weld line until the material has substantially set.

7. The method of welding relatively thin layers of thermoplastic sheet material which comprises superimposing the free edge portions of the layers with the edges projecting in the same direction, melting the superimposed edge portions along the line of the desired weld to form a seam between the layers at a point spaced inwardly of the edges thereby severing the undesired excess material at said edges, positioning the seam and the portions of the welded layers at each side of the seam in substantially coplanar relation with the layers extending from the seam in opposite directions, and cooling the melted material to stiffen the seam while said portions are held in coplanar position.

8. The method of welding relatively thin layers of thermoplastic sheet material which comprises superimposing the free edge portions of the layers with the edges projecting in the same direction, melting the superimposed edge portions along the line of the desired weld to form a seam between the layers at a point spaced inwardly of the edges thereby severing the undesired excess material at said edges, applying a cooling medium to the melted material to stiffen the seam, and positioning the seam and the portions of the welded layers at each side of the seam in substantially coplanar relation with the layers extending from the seam in opposite directions during at least the initial part of the cooling step before and until the melted material is substantially stiffened and set.

9. The method of claim 8 in which the cooling medium comprises a gas.

10. The method of welding relatively thin layers of thermoplastic sheet material which comprises positioning the layers in substantially coplanar relation against a supporting surface, with the free edge portions of the layers projecting outwardly from and substantially perpendicular to the surface in face-to-face contact with each other, applying heat to melt and sever the projecting free edge portions along a line spaced outwardly from the surface while said edge portions are in contact, thereby forming a projecting seam of melted material moving the seam toward said surface, and supporting the material at each side of the seam against the surface and thereby maintaining said material and seam in a common plane while the melted material of the newly formed seam is initially hardened into a butt weld.

11. Welding apparatus for joining relatively thin layers of thermoplastic sheet material during relative movement between the apparatus and material comprising a welding element adapted to soften and melt the material at a desired seam, means engaging the material before the material reaches the welding element and guiding the free edge portions of the layers in projecting face-to-face contact to the welding element to form a seam while the layers are in such contact, and support means engaging the welded material as it leaves the welding element and separating the layers adjacent the seam and positioning the seam and the portions of the layers at each side of the seam in substantially coplanar relation before the melted material of the seam is substantially set.

12. Welding apparatus for joining relatively thin layers of thermoplastic sheet material comprising means for holding the free edge portions of the layers in projecting face-to-face contact with the edges projecting in the same direction, means for melting and severing the projecting free edge portions to form the desired seam along a weld line spaced inwardly of the edges, and means engaging the main portions of the welded layers at each side of the seam and guiding said main portions and said seam into substantially a common plane with the layers projecting from the seam in opposite directions before the melted material of the seam substantially hardens.

13. Welding apparatus for joining relatively thin layers of thermoplastic sheet material by relative movement with respect to the material in the direction of the desired seam comprising means for guiding the free edge portions of the layers in face-to-face contact with their edges projecting in the same direction, means for melting and severing the projecting free edge portions to form the seam, and means for engaging the main portions of the welded layers at each side of the seam and guiding said portions and said seam into substantially a common plane during said relative movement before the melted material of the seam is substantially set.

14. Welding apparatus for joining relatively thin layers of thermoplastic sheet material comprising spaced guide members defining between them a channel into which the superimposed free edge portions of the material may project, a separating member for the layers positioned between the main portions of the layers adjacent that edge of the channel at which the main portions of the guide members and layers are to be located, and means supported in said channel for melting and severing the superimposed free edge portions and thereby forming a seam between the main portions along a line spaced outwardly from the separating member, the separating member having a size and relative location insuring engagement of the newly formed seam against the separating member and holding the material at each side of the seam in opposite extending coplanar relation while the seam initially sets.

15. Welding apparatus for joining relatively thin layers of thermoplastic sheet material comprising three longitudinal guide members spaced from each other around a longitudinal line corresponding to the direction of the desired seam and defining three radial channels meeting in said line, a combination cutting and welding member extending across one of the channels at a point spaced slightly from said line, means for heating the welding member and means causing relative movement of the material along the guide members with the free edge portions of the layers projecting in face-to-face contact into said one channel for operative engagement with the welding member, and with the main portion of each layer extending out through the remaining two channels respectively, the said remaining two channels having a relative location and orientation positioning the material and newly formed seam in substantially a common plane immediately after the desired seam is formed by relative movement of said welding member.

16. Welding apparatus for joining relatively thin layers of thermoplastic sheet material comprising three longitudinal guide members spaced from each other around a longitudinal line corresponding to the direction of the desired seam and defining three radial channels meeting in said line, two of the channels being substantially coplanar at the line of intersection and perpendicular to the third channel at said line, a cutting and welding member extending across the third channel at a point spaced slightly from said line, means for heating the welding member, and means for relative movement of material along said coplanar channels with the free edges of the material extending into said third channel in operative engagement with said welding member.

17. Welding apparatus for joining relatively thin layers of thermoplastic sheet material comprising means for holding the free edge portions of the layers in projecting face-to-face contact, means for melting the projecting edge portions to form the desired seam, a supporting shoe for engaging the portions of the welded layers at each side of the seam and holding said portions and said seam in substantially a common plane while the melted material hardens, and means insuring relative movement of the material past the melting means and thence along the shoe, the shoe having a recess opposite the seam preventing contact of the shoe and seam until the latter is set.

18. Welding apparatus for joining relatively thin layers of thermoplastic sheet material comprising means for holding the free edge portions of the layers in projecting face-to-face contact, means for melting and severing the projecting edge portions to form the desired seam between the main portions of the layers, a supporting shoe for engaging the main portions of the welded layers at each side of the seam before the melted material hardens, means including said shoe for positioning said main portions and said seam in substantially a common plane while the melted material hardens, and means for cooling the melted material.

19. Welding apparatus according to claim 18 in which the cooling means comprises means for circulating a cooling fluid through the shoe.

20. Welding apparatus according to claim 18 in which the cooling means comprises means for feeding a cooling medium directly against the seam.

21. Welding apparatus according to claim 18 in which the cooling medium includes a gas.

22. Welding apparatus for joining layers of thermoplastic sheet material arranged on a support which has a guide extending along the line of the desired seam and a platform adjacent the guide, the apparatus comprising a carriage, spaced elements on the carriage for engagement against the support guide to determine the line of movement of the carriage along the material, means on the carriage for welding the layers as the carriage moves, and a driving roller on the carriage for engaging the platform and moving the carriage along it, the roller being angularly mounted with respect to said line of movement determined by said spaced elements and thereby urging the carriage against the guide.

23. Welding apparatus for superimposed layers of flexible thermoplastic sheet material comprising a shoe having a longitudinal edge mounted for relative movement parallel to said edge between the layers of material in the direction of the desired seam, spaced guides mounted at each side of the shoe edge and cooperating therewith to define a pair of channels meeting at a point on the shoe edge for holding the respective layers of material against opposite sides of the shoe edge, the guides also cooperating with each other and defining a slot extending substantially perpendicularly outward from the meeting point of the channels for guiding the free edge portions of the material in projecting face-to-face engagement, and a heated welding member located in the slot adjacent the shoe and melting and fusing the free edge portions of the material to form a butt seam adjacent the shoe.

24. Welding apparatus for superimposed layers of flexible thermoplastic sheet material comprising a shoe having an edge portion with opposite faces along which the respective layers may pass in a direction parallel to said edge, spaced guides defining a slot located immediately adjacent the edge portion of the shoe and extending perpendicularly outward therefrom to hold the free edge portions of material in face-to-face engagement and guide the material around the shoe, and a heated welding member located at least partially within the slot adjacent the shoe for melting and severing the free edge portions of the layers within the slot.

25. Welding apparatus according to claim 24 in which at least one of the guides is adjustably mounted to vary the spacing between the guide and shoe.

26. Welding apparatus for butt-welding sheets of flexible thermoplastic material comprising a shoe having a longitudinal surface for relative longitudinal movement along the sheets in the direction of the desired seam, guide means for holding main portions of the sheets in substantially coplanar oppositely extending relation against the surface, with the free edge portions of the sheets projecting laterally from the surface in face-to-face engagement, a heated welding member parallel to and spaced from the shoe surface and intersecting the path of the extending free edge portions to melt and seal the same, and means for causing relative movement of the material past the welding member and along said shoe and thereby bringing the newly formed seam into coplanar relation with said main portions before the melted material is set.

References Cited in the file of this patent

UNITED STATES PATENTS

| | | |
|---|---|---|
| 1,899,067 | Trumbull | Feb. 28, 1933 |
| 2,220,545 | Reinhardt | Nov. 5, 1940 |
| 2,232,640 | Schwartzman | Feb. 18, 1941 |
| 2,289,618 | Young | July 14, 1942 |
| 2,360,950 | Kilgour | Oct. 24, 1944 |
| 2,467,385 | Kamborian | Apr. 19, 1949 |
| 2,495,680 | Andrews | Jan. 31, 1950 |
| 2,509,439 | Langer | May 30, 1950 |
| 2,524,584 | Zehr | Oct. 3, 1950 |
| 2,535,029 | Atanasoff et al. | Dec. 26, 1950 |
| 2,546,164 | Norris | Mar. 27, 1951 |
| 2,556,476 | Lamport | June 12, 1951 |
| 2,627,213 | Nye | Feb. 3, 1953 |